(12) United States Patent
Duis et al.

(10) Patent No.: US 11,209,670 B2
(45) Date of Patent: Dec. 28, 2021

(54) METHOD FOR DESIGNING EDGE TO EDGE PHOTOCHROMIC SOFT CONTACT LENSES

(71) Applicant: Johnson & Johnson Vision Care, Inc., Jacksonville, FL (US)

(72) Inventors: Donnie Duis, Jacksonville, FL (US); Pierre-Yves Gerligand, St. Johns, FL (US); Leilani Keahi Sonoda, Atlantic Beach, FL (US)

(73) Assignee: Johnson & Johnson Vision Care, Inc, Jacksonville, FL (US)

( * ) Notice: Subject to any disclaimer, the term of this patent is extended or adjusted under 35 U.S.C. 154(b) by 96 days.

(21) Appl. No.: 16/406,470

(22) Filed: May 8, 2019

(65) Prior Publication Data

US 2020/0355941 A1 Nov. 12, 2020

(51) Int. Cl.
*G02C 7/02* (2006.01)
*G02C 7/04* (2006.01)
*G02C 7/10* (2006.01)

(52) U.S. Cl.
CPC ............. *G02C 7/046* (2013.01); *G02C 7/022* (2013.01); *G02C 7/024* (2013.01); *G02C 7/049* (2013.01); *G02C 7/102* (2013.01); *G02C 2202/20* (2013.01)

(58) Field of Classification Search
CPC ........ G02C 7/022; G02C 7/024; G02C 7/027; G02C 7/04; G02C 7/049; G02C 7/102
See application file for complete search history.

(56) References Cited

U.S. PATENT DOCUMENTS

| 2008/0033546 | A1 | 2/2008 | Liang | |
|---|---|---|---|---|
| 2008/0151183 | A1 | 6/2008 | Altmann | |
| 2011/0176103 | A1* | 7/2011 | Iyer | G02C 7/061 351/159.44 |
| 2012/0176657 | A1* | 7/2012 | Marinelli | B29D 11/00009 359/241 |
| 2014/0036225 | A1* | 2/2014 | Chehab | A61P 27/02 351/159.02 |
| 2014/0347624 | A1 | 11/2014 | Ando et al. | |
| 2019/0121162 | A1 | 4/2019 | Alli et al. | |

* cited by examiner

*Primary Examiner* — Darryl J Collins

(57) ABSTRACT

The disclosure is related to a new soft contact lens with edge to edge photochromic material where geometry of the optical region and the peripheral region of the lens are optimized to give the best cosmetic effect on eye. The vision correction component and the mechanical component of that soft contact lens are designed independently from each other. The design of each component, vision and mechanical, is achieved by the mean of using diffractive optics.

62 Claims, 11 Drawing Sheets

METHOD FOR DESIGNING EDGE TO EDGE PHOTOCHROMIC SOFT CONTACT LENSES

BACKGROUND OF THE DISCLOSURE

1. Field of the Disclosure

The present disclosure relates to ophthalmic devices, such as wearable lenses, including contact lenses, implantable lenses, including inlays and onlays and any other type of device comprising optical components, and more particularly, to ophthalmic devices and methods for designing edge to edge photochromic ophthalmic devices.

2. Discussion of the Related Art

Soft contact lenses are primarily designed for correcting vision impairment, but other aspects of the lens are also considered during the design process such as handling (for lens insertion and removal), comfort, fit, or any other aspect that required consideration during the design process. Standard cosmetic lenses such as colored lenses provide cosmetic enhancement in the corneal region. In general, the printed pattern and/or colored region do not go up to the edge of the lens thus not visually impacting the scleral region of the eye.

In the present disclosure, a soft contact lens may comprise or may be formed from a monomer mix containing a photochromic dye material. In an aspect, as the photochromic dye is fully mixed with the lens material monomer, the photochromic region may cover the entire surface of the lens, affecting not only the corneal region of the eye but also the sclera. Once the lens is on eye and that the photochromic dye is activated the outer region of the lens may darken (e.g., exhibit a reduction of light transmission T % and a darker appearance to a viewer). If the peripheral thickness of the lens and the amount of photochromic dye are not correctly chosen, then the lens edge to sclera transition will not appear cosmetically appealing to the wearer due to at least the rapid change in darkness in that region. Furthermore, the vision correction provided by contact lenses is usually obtained by adjusting the refractive power within the optical region. For lenses with large power correction, significant variation in thickness is present in that optical region. High plus lenses (e.g., above +6.00 D) will have a thick central optic region, while high minus lenses (e.g., below −6.00 D) with have a thick peripheral optic region. AS an example, high plus lenses will a have a thick central optic region thinning toward the edge of the region, while high minus lenses with have a thin central optic region thickening toward the edge of the region. The minimum thickness either at the center or the edge of the optic zone is mostly driven by the material modulus. The variation in thickness in the optic zone is also driven by the choice of the optic zone diameter. Those significant variations in thickness within the optic zone will also have an impact on the cosmetic of the lens.

Improvements are needed.

SUMMARY OF THE DISCLOSURE

The present disclosure relates to ophthalmic lenses and methods wherein a lens thickness profile is designed to optimize the color change and the aspect of the lens on eye when the photochromic dye is activated. The present disclosure is related to a soft contact lens with edge to edge photochromic material where the optical region and the peripheral region of the lens are designed to give a target cosmetic effect on eye.

The photochromic effect within the pupil region must remain constant across its aperture. What is called photochromic effect is the amount of light transmitted to the eye, described as % T that represents the percentage of light going through when the dye is activated. This can be obtained by offsetting the front surface curvature from the back surface by a certain amount such that the radial thickness along the region remains constant or substantially constant. The radial thickness is the lens thickness calculated in the direction perpendicular to the back surface of the lens. This setting provides the same amount of % T independently of the region of the lens used. Vision correction obtained by the mean of refractive power cannot be achieved with this approach as based on the rules of refraction (Snell's law of refraction) the front and back surface of the lens needs to have different curvatures to provide a specific refractive power.

It may be desirable that the photochromic effect in the peripheral region not differ too much from the inner region. If the peripheral region is much thicker than the optical region, the periphery will look much darker and will not be cosmetically appealing to the wearer. Such conditions will occur with lenses of high minus powers, as shown in FIG. 1, where the center thickness is minimum and peripheral thickness is maximum providing the largest thickness difference. Similarly, for lenses with high plus power, as shown in FIG. 2, a large thickness difference will occur between the edge of the optic zone and the peripheral region.

For someone skilled in the art of designing soft contact lenses, there is no difficulty at designing a contact lens with constant thickness from its geometrical center to its edge (FIG. 3). Such lens will provide full cosmetic benefit but cannot provide appropriate vision correction, without more.

In the present disclosure vision correction (e.g., in accordance with a target vision profile) may be obtained using a diffractive optic approach where the vision correction is designed for a given thickness profile within the optic zone. The thickness profile may be optimized not for the optical aspect of the lens but for its mechanical aspect and geometrical aspect for cosmetic, comfort, handling and fitting purposes. More specifically, the cosmetic aspect or cosmetic profile of the lens may comprise a target lens thickness or the percentage of photochromic dye resulting in a specific level of % T and darkness when activated, or both. Other characteristics or performance metrics may be comprised in the cosmetic profile.

In accordance with the present disclosure, the comfort, handling, and fitting aspects of the lens defined by the lens material properties in combination with the mechanical and geometrical properties of the lens may be optimized or customized independently from the vision correction. The mechanical properties of the lens material may depend on the amount of the photochromic material added to the base monomer forming the lens material. Because the vision correction may be dissociated (e.g., fully disassociated, independent) from the mechanical aspect of the lens the geometry then can be optimized cosmetically to get the best visual effect on the eye, especially for the peripheral region of the lens covering a portion of the sclera where the photochromic dye when activated might be more visually obvious to the wearer.

BRIEF DESCRIPTION OF THE DRAWINGS

The foregoing and other features and advantages of the disclosure will be apparent from the following, more particular description of preferred embodiments of the disclosure, as illustrated in the accompanying drawings.

DETAILED DESCRIPTION

In the present disclosure a contact lens may comprise a front surface or surface power, a back surface or base curve and an edge. The front and back surface of the lens is described by at least three regions, the inner region from which the vision correction is obtained, the outer periphery of the lens that provides mechanical stability of the lens on eye, and an intermediate region located between the inner region and the outer region used for blending the two aforementioned regions in a smooth manner such that discontinuities do not occur.

The "optical zone" is defined as the substantially central portion of the lens which contains the visual power correction for the wearer's ametropia and/or presbyopia. "Ametropia" is defined as the optical power needed to provide good visual acuity, generally at far distance. It is recognized that this would include myopia or hyperopia. Presbyopia is corrected by adding algebraically positive optical power to a portion of the optical zone to correct the wearer near visual acuity requirements. It is recognized that these optical powers may be created by refractive means, or diffractive means, or both.

The peripheral zone may provide stabilization of the lens on the eye including, centration and orientation. That region of the lens provides also the mechanical properties such as handling related to ease of insertion and ease of removal, comfort and fit. The lens tightness on the eye drives either a loose fit which could lead to too much movement or a tight fit which could lead to not enough movement. Orientation stabilization may be desirable when the optical zone contains non-rotationally symmetric features, such as astigmatic correction and/or high order aberrations correction. The intermediate zone may provide that the optical zone and the peripheral zone are blended with tangent curves. It is important to note that both the optical zone and the peripheral zone may be designed independently, though sometimes their designs are strongly related when specific requirements are necessary. For example, the design of a toric lens with an astigmatic optical zone might require a peripheral zone for keeping the lens at a predetermined orientation on the eye.

The photochromic effect may be obtained cosmetically with a constant thickness across the inner and outer region of the lens. This cannot be achieved in the inner region of the lens as the vision correction is usually obtained through refractive power requiring a thickness change either at the center of the lens or at the edge of the optic zone to accommodate for the change in curvature of the front surface of the lens.

Figure 1:
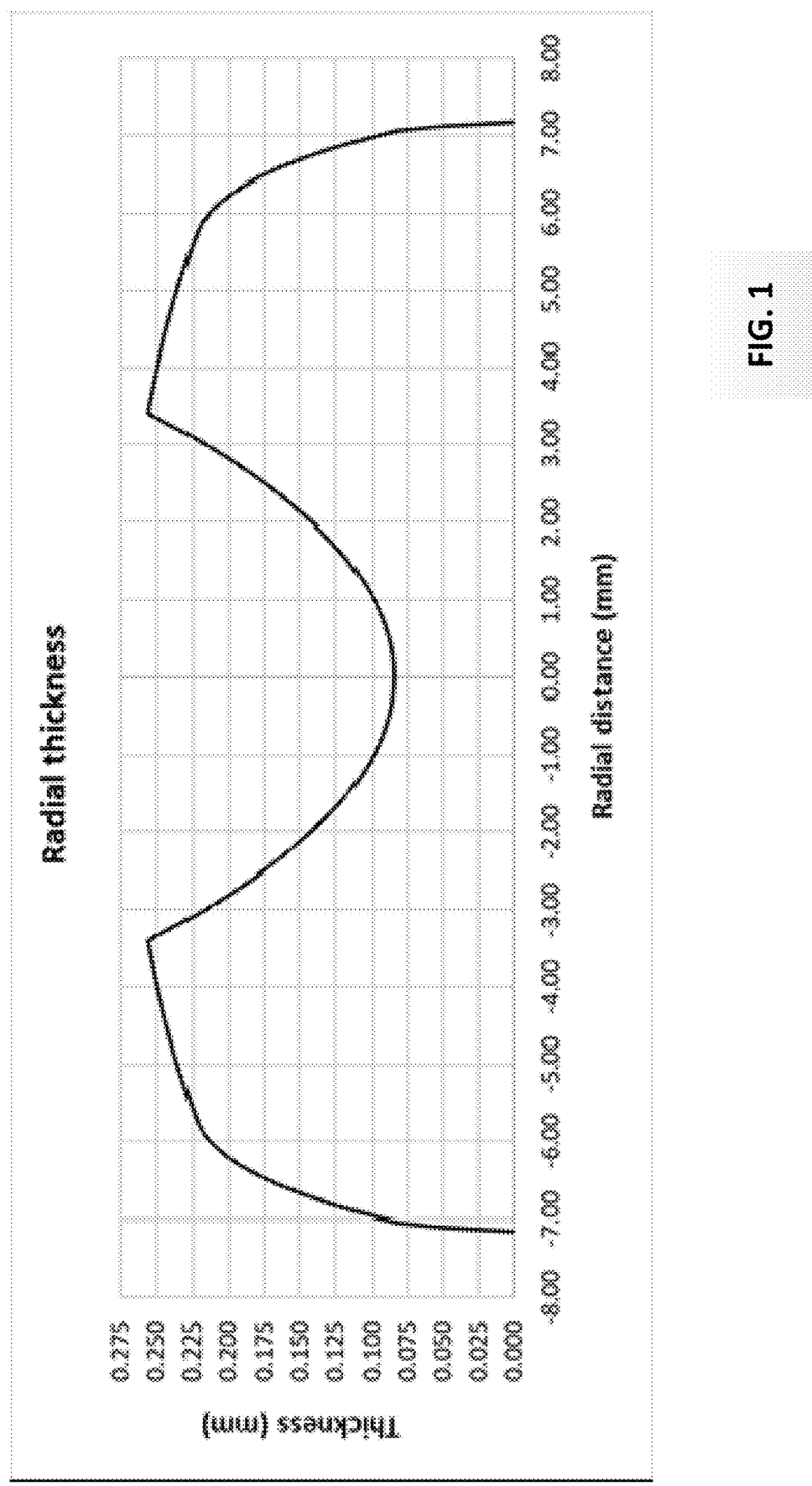
FIG. 1 is a cross-section of a high minus lens where the thickest region in the central optic zone is at its center.
Figure 2:
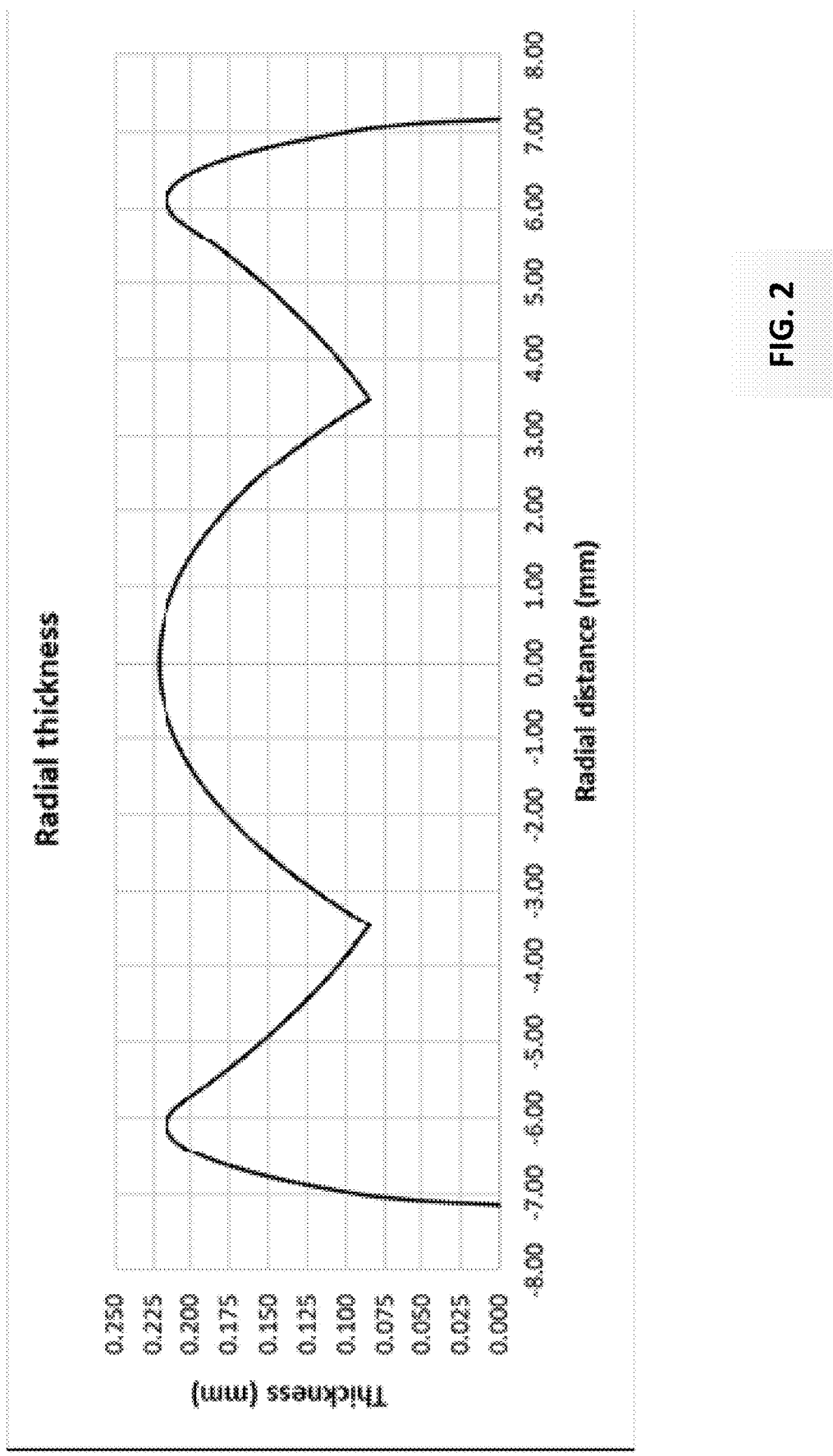
FIG. 2 is a cross-section of a high plus power lens where the thickest region in the central optic zone is at its edge.
Figure 3:
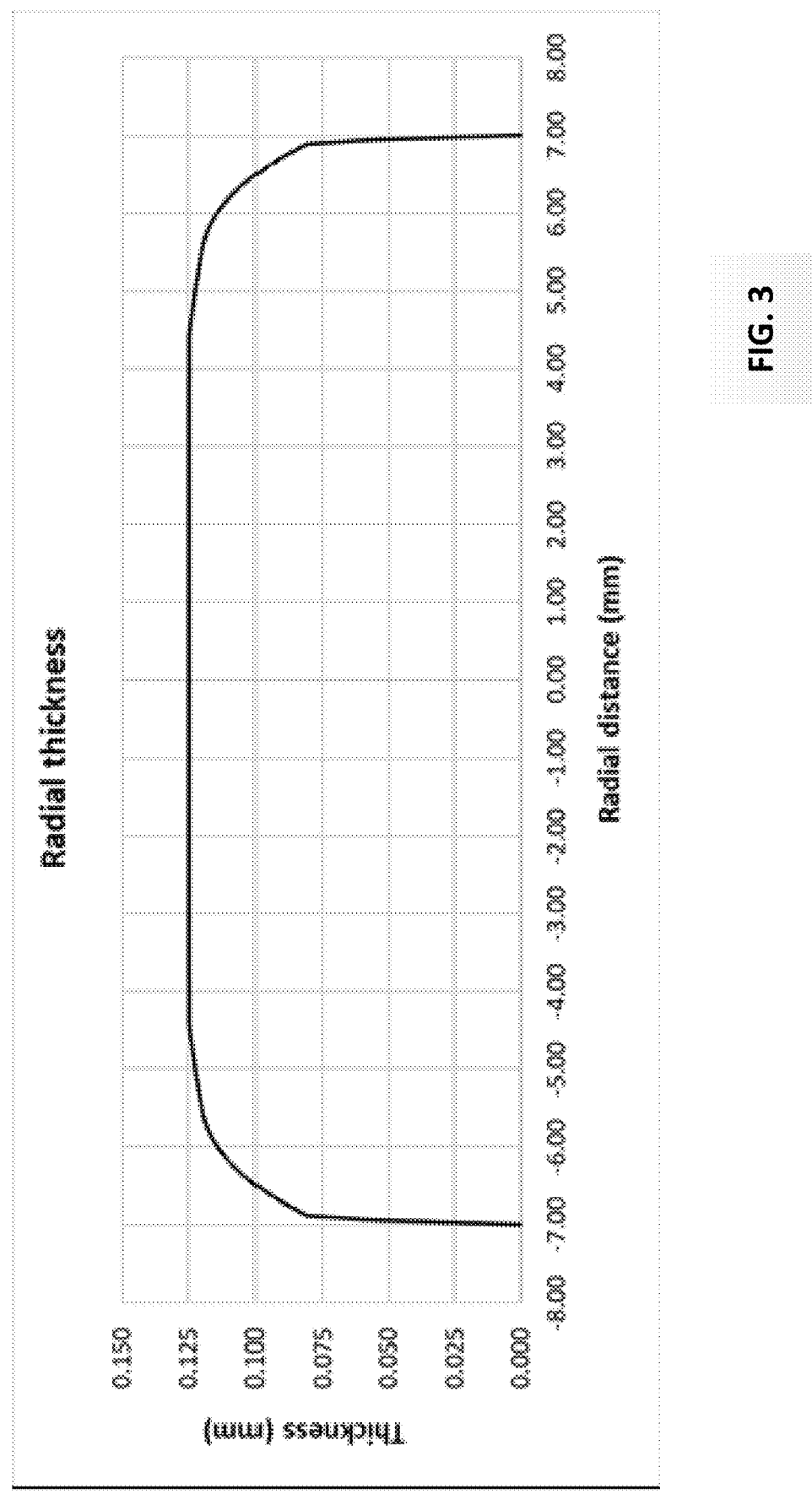
FIG. 3 is a cross-section of a lens where the radial thickness remains constant from center to edge.
Figure 4A:
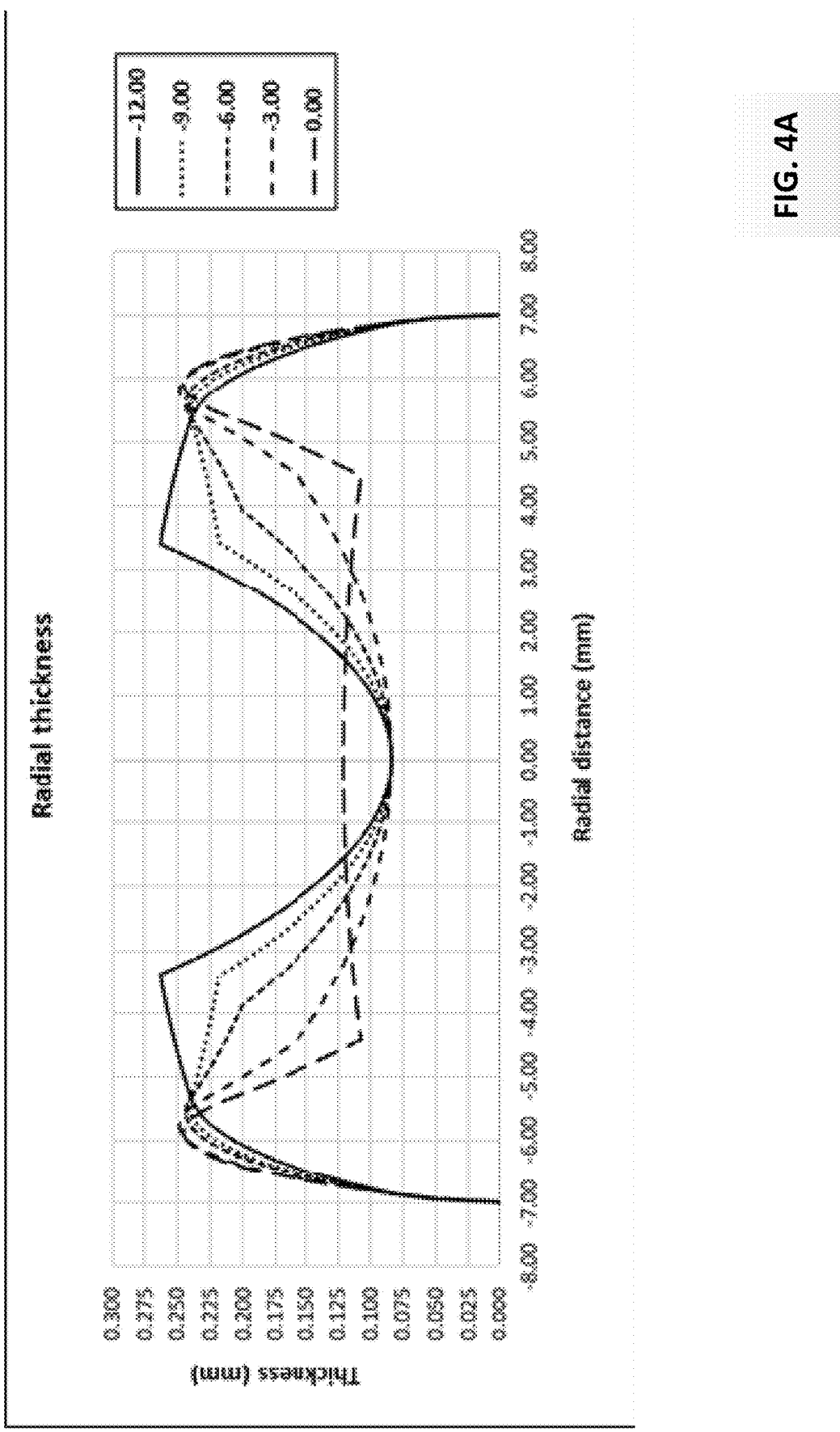
FIGS. 4A-4B show examples of radial peripheral thicknesses for a single vision type contact lenses for multiple SKUs ranging from −12.0 D to +8.00 D.
Figure 4B:
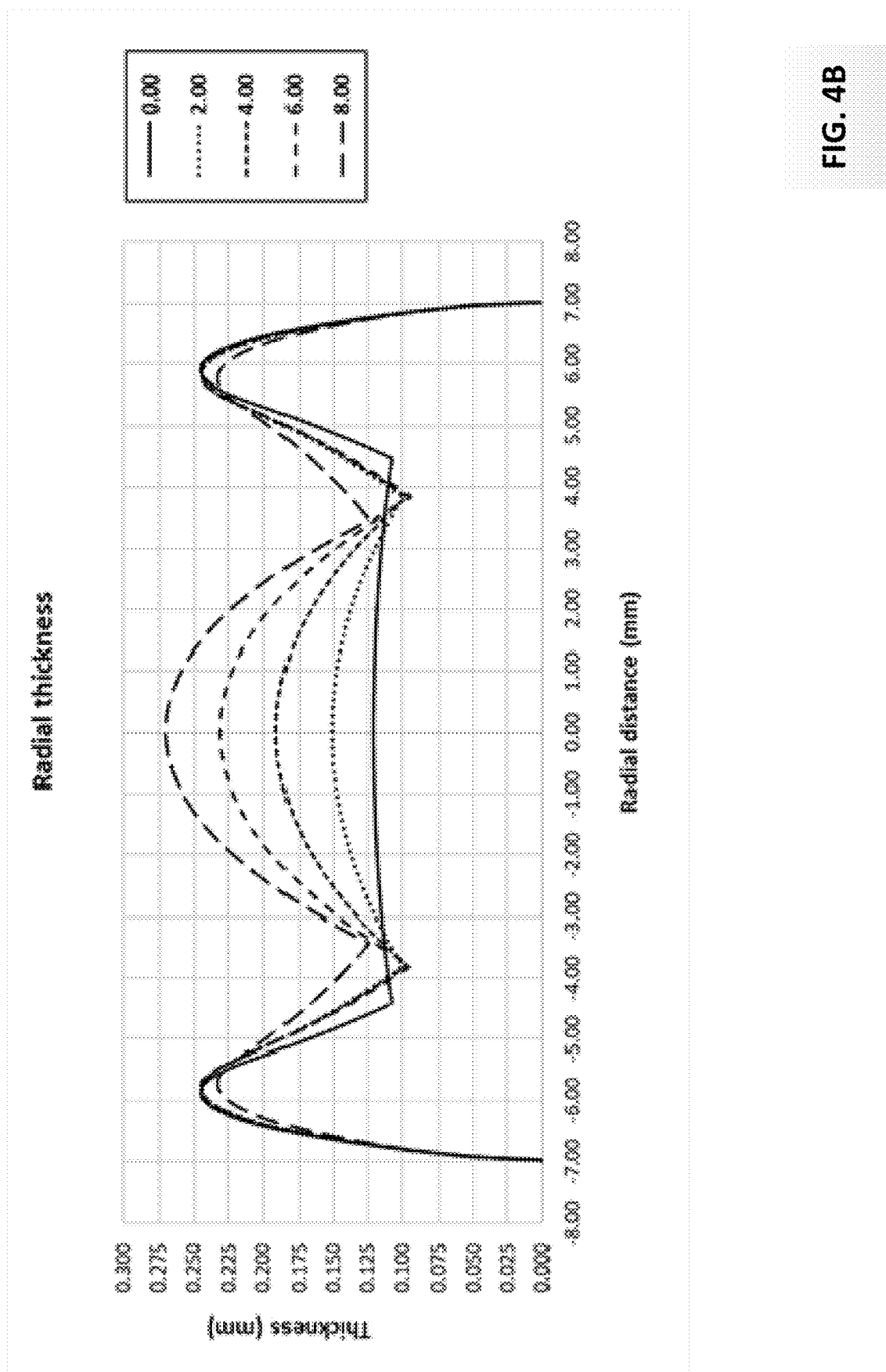

FIGS. 4A-4B illustrate examples of lens radial thickness for SKUs ranging from −12.0 D to 8.00 D for single vision soft contact lenses. The center thickness (CT) may vary from 0.70 mm to 0.270 mm across the full SKU range with a minimum thickness and maximum thickness values driven by the lens material refractive index, choice of optic zone diameter and lens material mechanical properties. The maximum peripheral thickness (PT) may vary based on the same lens material and lens design choices as for the CT.

A mechanical component of the lens may be designed to best provide a cosmetic effect. The target photochromic effect (e.g., based on a cosmetic profile) may be obtained cosmetically with a constant thickness across the inner and outer region of the lens. For example, the center thickness may be adjusted based on the desired darkness driven by the amount of photochromic dye present in the monomer mix. For low concentration (e.g., concentration below 1.00%) of photochromic dye, a larger center thickness might be required to achieve the same amount of darkness obtained with a larger concentration of photochromic dye. The center thickness may also be adjusted based on the desired amount of % T that might also lead to a different level of darkness.

For someone skilled in the art of designing soft contact lenses it is known that a thicker peripheral region provides better handling performance. Thickness in the peripheral region may be dependent on the material stiffness. Stiffer lens material requires less thickness in the periphery to achieve the same handling performance than a softer material. The difference in thickness between the edge of the optic zone and inner region of the periphery is managed through the intermediate region which purpose is to blend both regions in a smooth matter. For a photochromic lens a compromise might be required for the peripheral thickness such that the peripheral region of the lens is thicker than the inner region of the lens to maintain handling and still provide better cosmetic effect than a regular lens.

Other criteria may also be considered during the lens design process such as lens inversion, lens folding, lens wrapping usually evaluated through FEA modeling. Such criteria, related to the lens mechanical performance, can also be included during the process of optimizing the cosmetic effect and adjusted according to the desired lens performance.

A vision correction component (e.g., based on a vision profile) may be designed based on the selected thickness profile of the inner region of the lens. For someone skilled in the art of designing soft contact lenses it is well understood that the inner region can be optimized for multiple levels of thickness. It must note that this second step of the disclosure can be carried out in parallel to the first step of the disclosure.

Figure 5B:
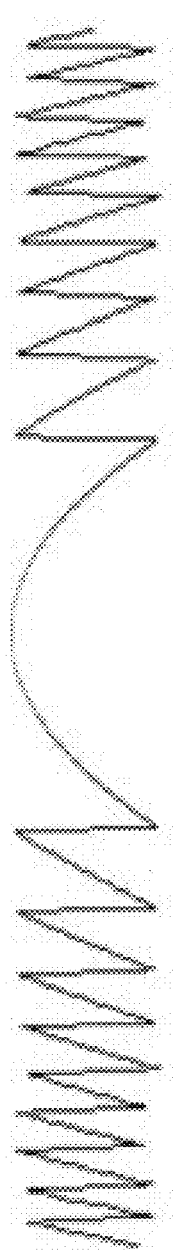
FIGS. 5A and 5B are two views of an exemplary diffractive surface.
Figure 5A:
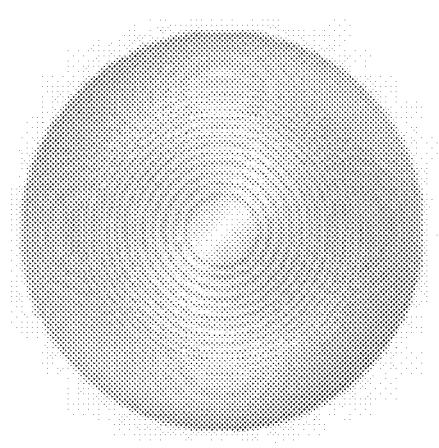

There is a benefit at using a diffractive approach because a diffractive optical zone can create power at the surface of a lens that is independent from the surface shape. Furthermore, the lens power can be a combination of refractive power and diffractive power that could provide the overall required power. A diffractive lens surface has the general properties depicted in the planar and cross-sectional surface profiles shown in FIGS. 5A and 5B. It consists of many small zones that are separated by steps. The steps are exaggerated in the figure, they would typically be only a few microns high. This structure would be added onto an underlying base curve. Each zone, corresponding to a ring, has approximately the same surface area and the width decreases the further way the ring is located from the geometrical center. The general simplified equation that gives the radial distance $r_i$ of the ith zone boundary from the center is $$r_i^2 = 2 \cdot i \cdot \omega / P \quad (1)$$

where P is the diffractive power in diopters at the design wavelength $\omega$. A convenient use of units is to put the wavelength in microns (e.g. 0.543) and power in diopters to give radius in mm.

One way to think about diffractive lenses is to note that light waves are periodic, and that they repeat after every wavelength. The zone boundaries are typically placed where the optical paths to the desired image point increase by a wavelength. This can be thought of as seeing the light spread out across the surface, in order to identify individual waves. For a standard monofocal diffractive lens, a physical step height is placed at the step location to delay the light by 1 wavelength. The region between the steps is a parabolic surface that essentially also focuses the light to the desired image location. At the design wavelength, in principle, all the light is being focused correctly, and the raytracing concept of light rays all going to a focus agrees with the wave front concept of light.

The diffractive structure may be implemented as a physical microrelief on one of the lens surfaces, and this would presumably be in contact with the tear film, which has a refractive index of about 1.336. An alternative would be to create the physical profile at the intersection of two surfaces of different materials within the lens itself. The height of each step is given by $$h = \omega / (n_2 - n_1) \quad (2)$$

where $n_2$ and $n_1$ are the refractive index values of the two materials. Using index values of 1.42 and 1.336 for example, the physical step heights would be about 6.5 microns for a wavelength of 0.543 um.

The number of zones for a given diffractive lens diameter is given by equation 1, which can be rearranged to be $$Nzones = ((0.5 \cdot Diameter)^2 \cdot P) / (2 \cdot \omega) \quad (3)$$

For a diffractive diameter of 8.5 mm, and a power of 4.0 D, this would be 66 zones, each with a step at the boundary of 6.5 microns.

The width of the outer zone is also given in Table 1 below. This gives an indication of how accurately a step needs to be manufactured in order to not obstruct a significant part of a zone. For the 4.0 D with 8.5 mm diameter, the outer zone width of 32 microns is about ⅕ of the step height.

TABLE 1

| Diffractive Power (Diopter) | N zones | Minimum zone width (mm) (last zone) |
|---|---|---|
| 1 | 17 | 0.128 |
| 2 | 33 | 0.065 |
| 3 | 50 | 0.043 |
| 4 | 67 | 0.032 |

For someone skilled in the art of designing soft contact lenses there are other critical aspects in designing diffractive surfaces that drive optical performance that have not been described in detail. Those may include longitudinal chromatic aberration, diffraction efficiency and scattering from steps.

The diffractive surface could be placed on the front surface of the lens or the back surface of the lens. The diffractive surface must be always covered by a tear film, with the tear film surface being continuous, with no pattern from the diffractive structure. The diffractive surface might be preferably placed on the back surface of the lens. The diffractive power could also be split between both surfaces to minimize the zone height for high lens power. Another solution will be to imbed the diffractive surface inside the lens.

For refractive power based soft contact lenses the optic zone diameter varies across the SKU range due to thickness constrain. High minus lenses (e.g., below −6.00 D), requiring flat front curvatures, have smaller optic zone diameters than low power lenses due to the large thickness at the edge of the optic zone. To control the thickness at that location the optic zone diameter is reduced such that the thickness is about of the same magnitude than the maximum peripheral thickness (FIGS. 4A and B). High plus lenses, requiring stepper front curvatures, also have smaller optic zone diameters than low power lenses due to large thickness at the center of the optic zone. To control the thickness at that location the optic zone diameter is reduced such that the center thickness is about of the same magnitude than the maximum peripheral thickness.

Because the optics are designed based on the diffractive principle and that is independent of the base surface/carrying surface, thickness constraints are not present any more allowing the SKU across the SKU range to have the same OZ diameter. Usually OZ diameter ranges from 7.00 mm to 9.50 mm dues to those thickness constraints. For a diffractive type designs the optic zone diameter is not limited to small diameters for high power SKUs. The OZ diameter is preferably set to at least a minimum of 8.50 mm and preferably 9.00 mm. The only constraint that might drive the OZ diameter to smaller values will be the size of the diffractive zones. The width of the outer zones of the diffractive surface has to be wide enough to still be manufacturable.

EXAMPLES

A thickness ratio may be defined as the center thickness over the maximum peripheral thickness. The thickness ration is introduced in the example section in the second paragraph. The smaller the ratio is the larger the discrepancy is in thickness between center thickness and max peripheral thickness. A ratio of one will correspond to a lens of constant thickness.

Figure 6B:
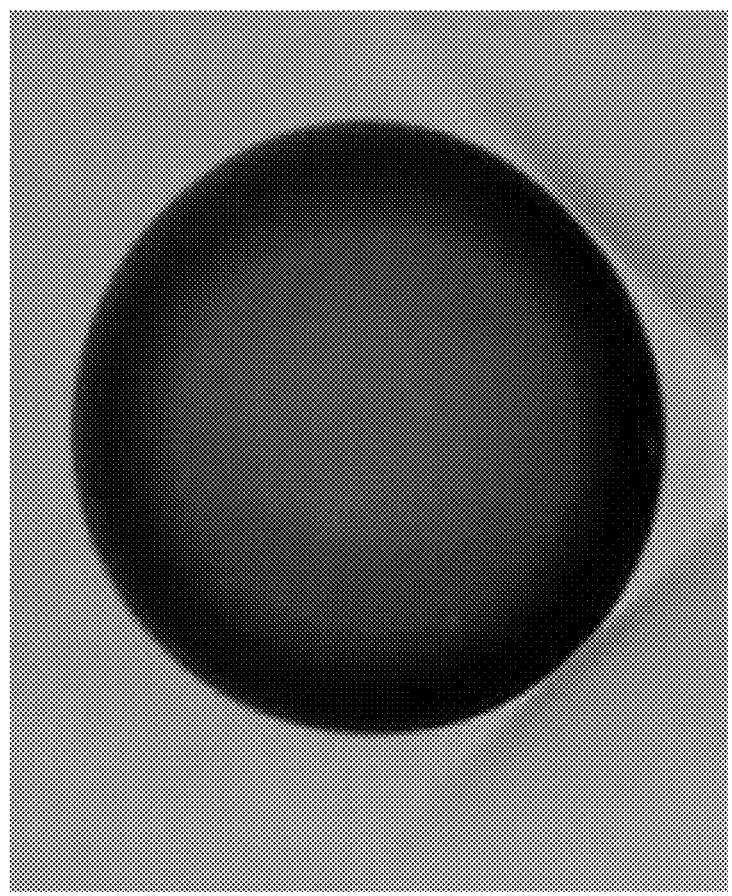
FIGS. 6A and 6B illustrate an example of a soft contact lens containing 1% of photochromic dye that has been activated and one containing 4% of photochromic dye that has been activated.
Figure 6A:
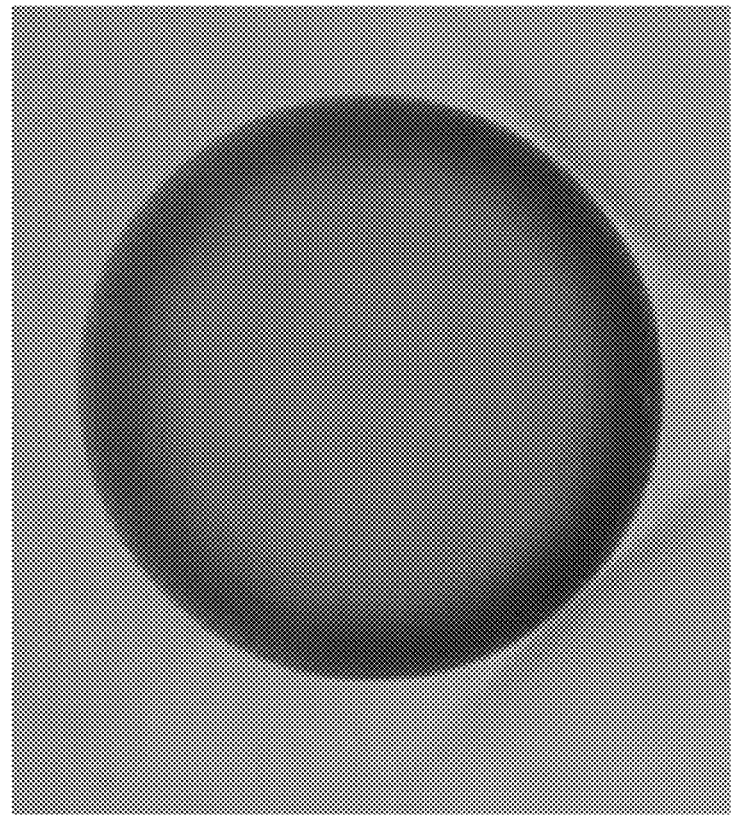

In FIGS. 6A and 6B a photochromic lens was obtained using the standard geometry of a soft contact lens such as an Acuvue2 lens. The prescription of that lens is −1.00 D. The amount of dye between the first example (A) and second example (B) varies from 1.0% to 4.0%. Both images depict the lens when the dye is activated. In each case it is obvious to discern the optic zone from the periphery of the lens because of the difference in darkness. In that example the lens center thickness is about 0.124 mm and the maximum peripheral thickness is about 0.240 mm. The CT/PT thickness ratio is about 0.51.

Figure 7:
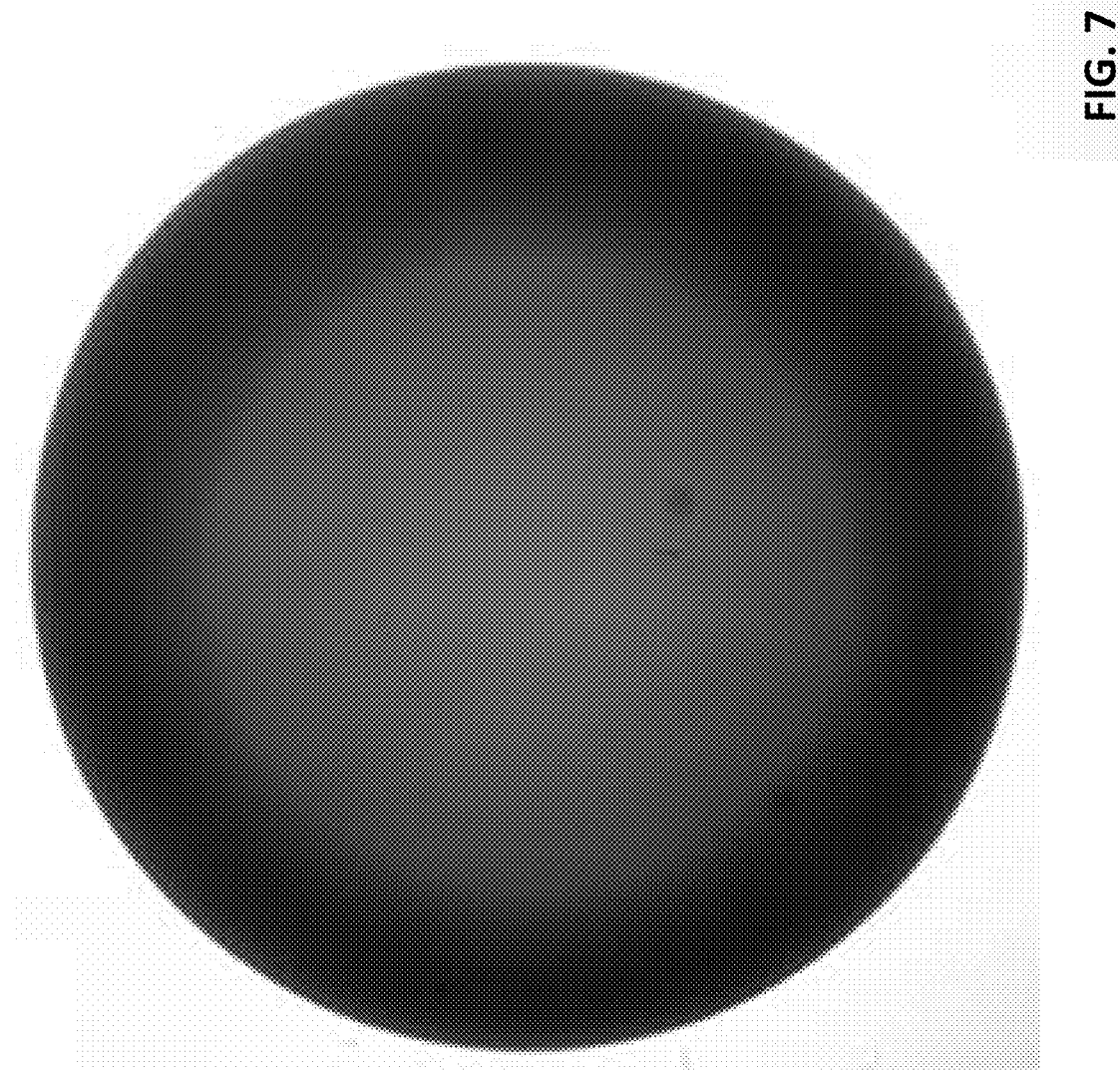
FIG. 7 is an example of a soft contact lens containing 4% of photochromic dye that has been activated.

In a second example (FIG. 7.), a −1.00 D power photochromic lens was obtained using 1% of photochromic dye added to the monomer mix. The lens center thickness is about 0.080 mm and the maximum peripheral thickness is about 0.203 mm. The CT/PT thickness ratio is about 0.39. Similar to the previous example, the optic zone is lighter in darkness than the peripheral region of the lens. Both regions are very distinct to each other when the photochromic dye is activated.

Figure 8:
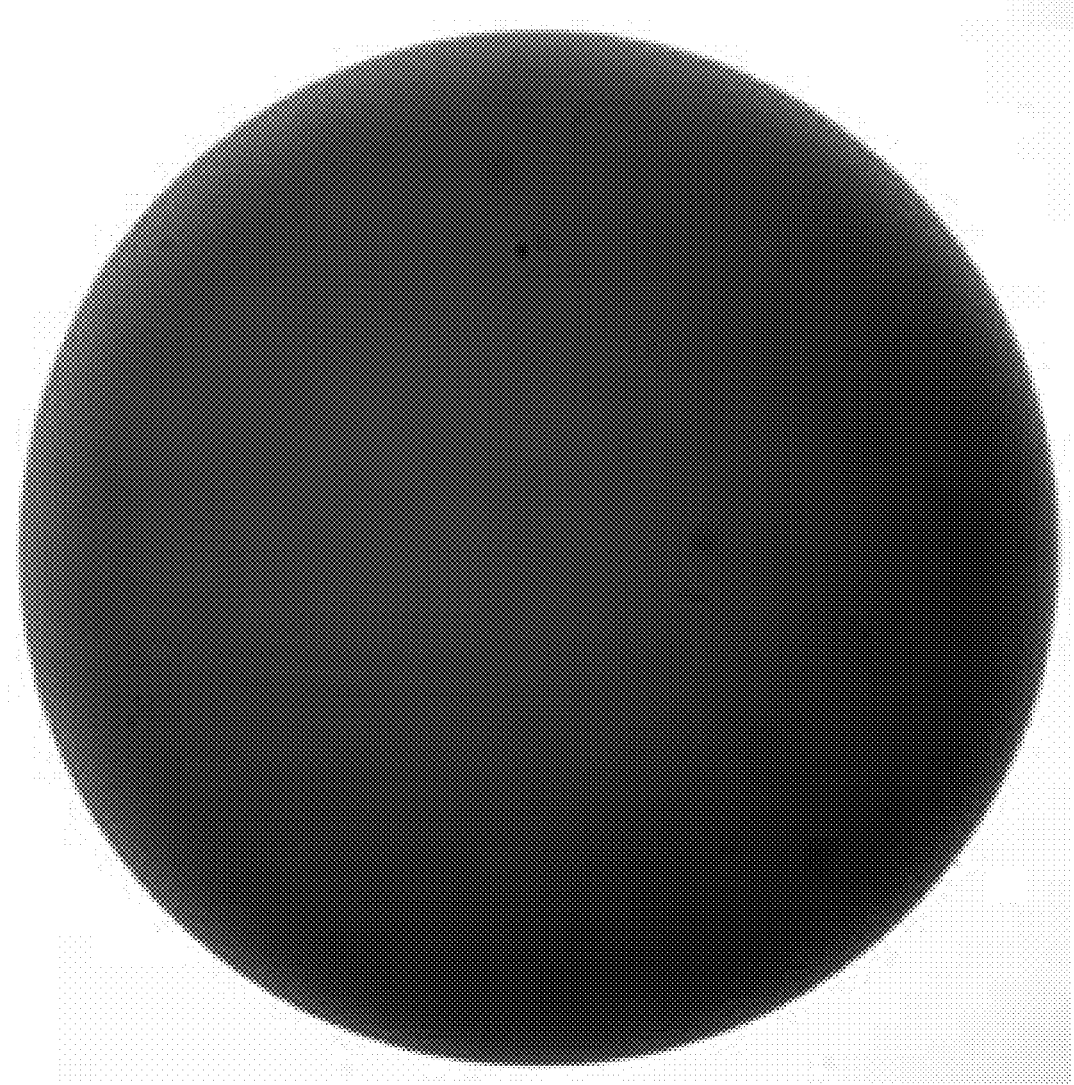
FIG. 8 is an example of a soft contact lens containing 1% of photochromic dye that has been activated.
Figure 9:
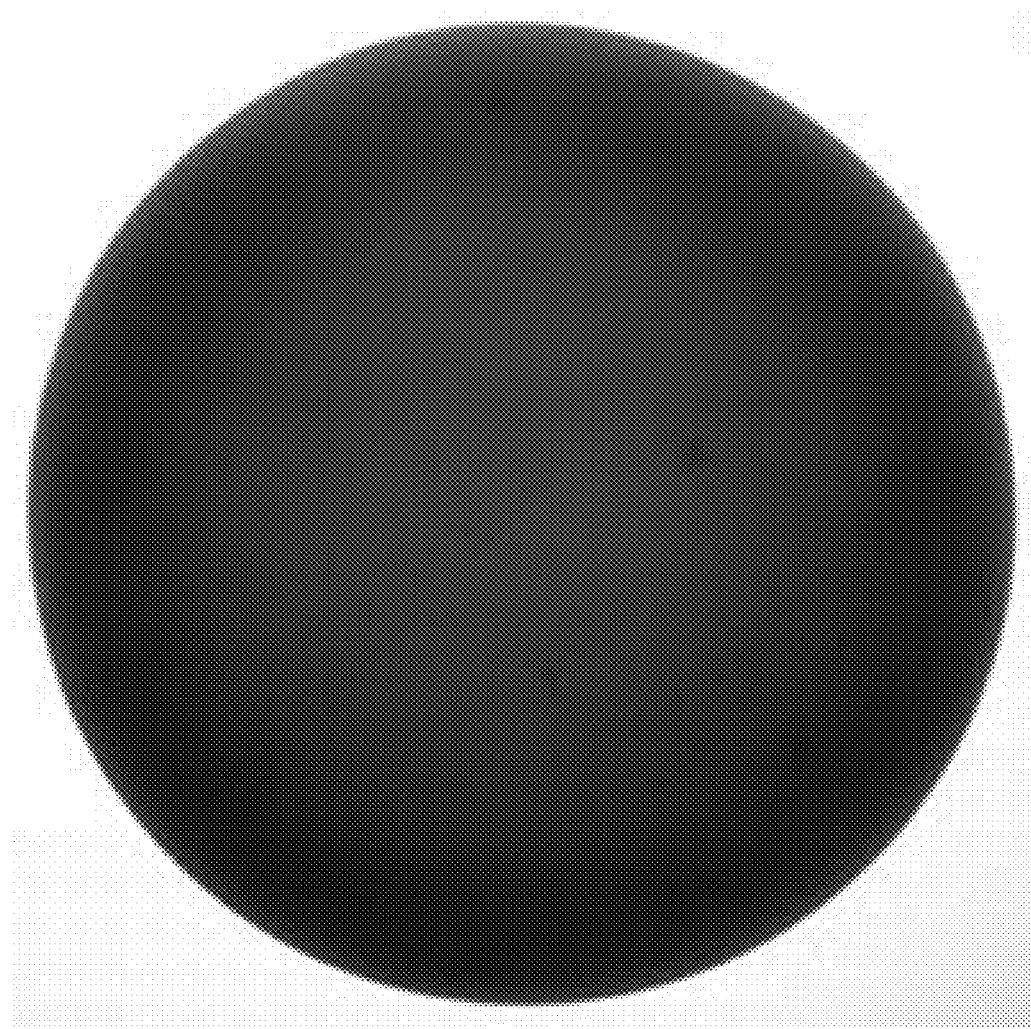
FIG. 9 is an example of a soft contact lens containing 1% of photochromic dye that has been activated.
Figure 10:
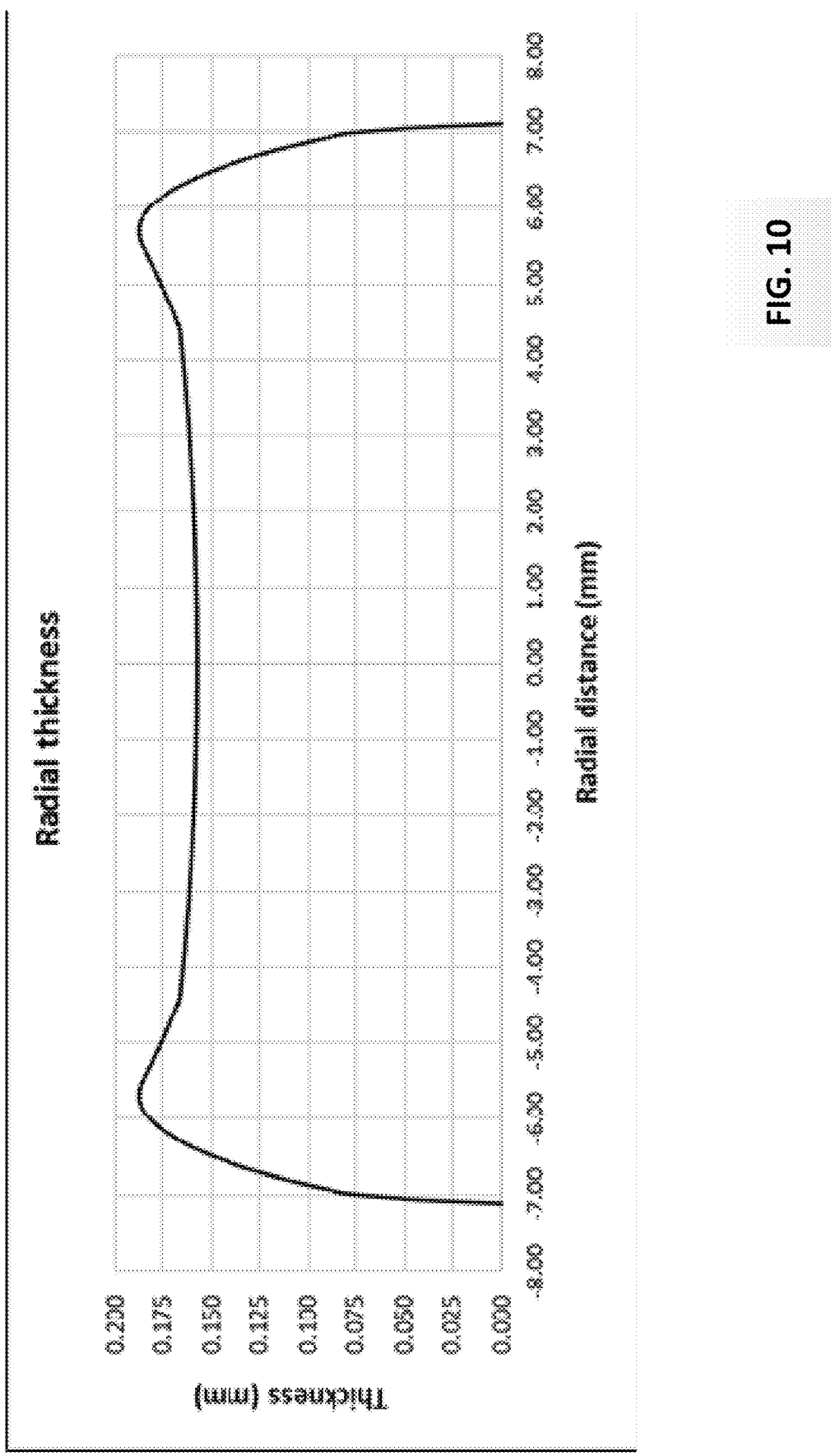
FIG. 10 is a cross-section of a lens where the thickness profile in the central optic zone and peripheral region has been designed to optimize the cosmetic aspect of the lens on eye when the photochromic dye is activated.

In FIG. 8, a −1.00 D power photochromic lens was obtained using 1% of photochromic dye added to the monomer mix. The lens center thickness is about 0.158 mm and the maximum peripheral thickness is about 0.187 mm. The CT/PT thickness ratio is about 0.85. In another example, FIG. 9, a −1.00 D power photochromic lens was also obtained using 1% of photochromic dye added to the monomer mix. The lens center thickness is about 0.117 mm and the maximum peripheral thickness is about 0.182 mm. The CT/PT thickness ratio is about 0.64. So, by thickening the optics area while thinning out the peripheral region we can achieve a balance in the darkness over the entire lens while decreasing the amount of transmitted light (% T). In a preferred embodiment, the CT/PT thickness ratio must be at least greater than 0.65 to obtain a lens cosmetically acceptable, but preferably greater than 0.85. FIG. 10 presents the radial peripheral thickness of the soft contact lens with a thickness ratio of 0.85. Larger center thickness will provide thicker peripheral thickness for the same thickness ratio that will yield to better handling performance.

In the examples provided the ratio is defined from the CT and the maximum peripheral thickness as the refractive lens power was −1.00 D. For plus lenses the thickness ratio should be defined from the optic zone edge thickness and the maximum peripheral thickness. Preferably the thickness ratio should be defined from the minimum thickness within the optic zone and the maximum peripheral thickness.

A lower aspect ratio can be obtained if the amount of photochromic dye is applied gradually in the peripheral region of the lens providing larger peripheral thickness for further improvement in handling if required.

It should be obvious for someone skilled in the art of designing soft contact lenses that adding the diffractive component to a lens with thickness profile corresponding to one of the last examples will not change the cosmetic characteristic of that lens when the photochromic dye will be activated.

Design Methods

The present disclosure relates to methods of designing a soft contact lens with photochromic material where the optical region and the peripheral region of the lens are designed to give the best cosmetic effect on eye. The contact lens comprises a rigid surrogate covered with a skin of material commonly used for soft contact lenses. The reactive photochromic dye material may be part of the monomer forming the outer skin of the lens (mixed with the main monomer constituting the material of the soft contact lens) or part of the rigid material forming the surrogate, or both, such that the photochromic region of the lens is either defined within the geometrical center of the lens or up to its edge in case the photochromic region is built within the outer skin or from a combination of the outer skin and the surrogate.

One purpose of the surrogate is to provide the vision correction needed using diffractive optics as a mean to create the required vision correction. The methods of the present disclosure can be applied to any type of vision correction including, but not limited to, low order aberrations such as defocus resulting from myopia or hyperopia, astigmatism, presbyopia, and the like; and high order aberrations resulting from conditions such as keratoconus and the like; or any other vision correction that uses patient-specific vision information. One advantage of using diffractive optics is that the mechanical geometry of the surrogate does not have to differ much to provide a large range of vision correction.

Soft contact lenses are primarily designed for correcting vision impairment, but other aspects of the lens are also considered during the design process such as handling (for lens insertion and removal), comfort, fit, or any other aspect that required consideration during the design process. Standard cosmetic lenses such as colored lenses provide cosmetic enhancement in the corneal region. In general, the printed pattern and/or colored region do not go up to the edge of the lens thus not visually impacting the sclera region of the eye.

In the present disclosure the photochromic region might cover the entire surface of the lens, affecting not only the corneal region of the eye but also the sclera. Once the lens is on eye and that the photochromic dye is activated the outer region of the lens will possibly also darken. If the peripheral thickness of the lens and the amount of photochromic dye are not correctly chosen, then the lens edge to sclera transition will not appear cosmetically appealing to the wearer due to the rapid change in darkness in that region. The proposed design provides a solution to that visual effect where the peripheral thickness is designed to optimize the color change and the aspect of the lens on eye when the photochromic dye is activated.

Because the vision correction aspect of the lens is provided from the surrogate and the remaining aspects of the lens such as handling, comfort, fit, or any other aspect that required consideration during the design process, is provided from the outer skin, thus the mechanical performance and optical performance are controlled independently providing multiple benefits to the contact lens. A unique soft skirt can be designed to specific needs such as handling, fit, comfort, or can be designed identically across the full SKU range such that it provides:

Same or substantially the same handling performance through the SKU range

Same or substantially the same fit across the full SKU range

Same or substantially the same comfort performance across the full SKU range

The diffractive optics can be either applied to the front surface of the surrogate, the back surface of the surrogate, or a combination of both.

The followings are examples on how both components can be combined to obtain different photochromic effects:

A particular case where the surrogate only provides the photochromic region defined only in the central region of the lens.

Another particular case where the outer skin only provides the photochromic region defined from edge to edge of the lens.

Another particular case where the surrogate and the outer skin provide the photochromic region defined from edge to edge of the lens. In this particular case the effect of the photochromic dye (level of darkness) can be either identical or different in both regions.

Although shown and described in what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated but should be constructed to cohere with all modifications that may fall within the scope of the appended claims.

What is claimed is:

1. A photochromic ophthalmic lens comprising:
a main body comprising an optical zone and a peripheral zone disposed adjacent the optical zone, wherein the optical zone comprises a refractive structure and one or more of the optical zone and the peripheral zone comprises a photochromic dye; and
a diffractive structure disposed within or adjacent the optical zone,
wherein the ophthalmic lens has a thickness profile that is configured based on a cosmetic profile associated with a target level of transmission (% T),
wherein a vision profile associated with the ophthalmic lens is defined based at least on the diffractive structure; and
wherein the thickness profile is optimized based on the cosmetic profile over the vision profile.

2. The photochromic ophthalmic lens of claim 1, wherein the cosmetic profile comprises a target amount of the photochromic dye in one or more of the optical zone and the peripheral zone.

3. The photochromic ophthalmic lens of claim 1, wherein the vision profile comprises an optical power profile.

4. The photochromic ophthalmic lens of claim 1, wherein the vision profile is defined based on at least the refractive structure and the diffractive structure.

5. The photochromic ophthalmic lens of claim 1, wherein the vision profile is associated with a target optical power.

6. The photochromic ophthalmic lens of claim 5, wherein the target optical power is between −20 D and +20 D.

7. The photochromic ophthalmic lens of claim 5, wherein the target optical power is between −12 D and +8 D.

8. The photochromic ophthalmic lens of claim 1, wherein the diffractive structure is disposed on a rear optical surface of the photochromic ophthalmic lens.

9. The photochromic ophthalmic lens of claim 1, wherein the diffractive structure is disposed on a front optical surface of the photochromic ophthalmic lens.

10. The photochromic ophthalmic lens of claim 1, wherein the diffractive structure is disposed on one or more of a front optical surface or a rear optical surface of the photochromic ophthalmic lens.

11. The photochromic ophthalmic lens of claim 1, wherein the diffractive is imbedded in the photochromic ophthalmic lens.

12. The photochromic ophthalmic lens of claim 1, wherein photochromic ophthalmic lens comprises a soft contact lens.

13. The photochromic ophthalmic lens of claim 1, wherein a thickness ratio is greater than 0.65.

14. The photochromic ophthalmic lens of claim 1, wherein a thickness ratio is greater than 0.75.

15. The photochromic ophthalmic lens of claim 1, wherein a thickness ratio is greater than 0.85.

16. The photochromic ophthalmic lens of claim 1, wherein the diffractive structure is disposed adjacent a periphery of the optical zone.

17. The photochromic ophthalmic lens of claim 1, wherein the diffractive structure is disposed adjacent the peripheral zone.

18. The photochromic ophthalmic lens of claim 1, wherein the diffractive structure is disposed about a circumference of the optic zone.

19. The photochromic ophthalmic lens of claim 1, wherein the diffractive structure is circumferentially disposed around at least a portion of the optical zone.

20. The photochromic ophthalmic lens of claim 1, wherein the diffractive structure is circumferentially disposed around the optic zone at a predetermined radius from the center of the optic zone.

21. The ophthalmic lens according to claim 1, wherein the diffractive structure comprises mechanical features configured to exhibit optical diffraction of incident light.

22. A method for making a photochromic ophthalmic lens comprising: determining a vision profile;
determining a cosmetic profile associated with a target level of transmission (% T);
forming a main body comprising an optical zone and a peripheral zone disposed adjacent the optical zone, wherein the optical zone comprises a refractive structure and one or more of the optical zone and the peripheral zone comprises a photochromic dye, wherein one or more of the optical zone and the peripheral zone has a thickness profile that is configured based on the cosmetic profile; and
forming, based on the vision profile, a diffractive structure disposed within or adjacent the optical zone;
wherein the thickness profile is optimized based on the cosmetic profile over the vision profile.

23. The method of claim 22, wherein the cosmetic profile comprises a target amount of the photochromic dye in one or more of the optical zone and the peripheral zone.

24. The method of claim 22, wherein the vision profile comprises an optical power profile.

25. The method of claim 22, wherein the vision profile is defined based on at least the refractive structure and the diffractive structure.

26. The method of claim 22, wherein the vision profile is associated with a target optical power.

27. The method of claim 26, wherein the target optical power is between −20 D and +20 D.

28. The method of claim 26, wherein the target optical power is between −12 D and +8 D.

29. The method of claim 22, wherein the diffractive structure is disposed on a rear optical surface of the photochromic ophthalmic lens.

30. The method of claim 22, wherein the diffractive structure is disposed on a front optical surface of the photochromic ophthalmic lens.

31. The method of claim 22, wherein the diffractive structure is disposed on one or more of a front optical surface or a rear optical surface of the photochromic ophthalmic lens.

32. The method of claim 22, wherein the diffractive is imbedded in the photochromic ophthalmic lens.

33. The method of claim 22, wherein photochromic ophthalmic lens comprises a soft contact lens.

34. The method of claim 22, wherein a thickness ratio is greater than 0.65.

35. The method of claim 22, wherein a thickness ratio is greater than 0.75.

36. The method of claim 22, wherein a thickness ratio is greater than 0.85.

37. The method of claim 22, wherein the diffractive structure is disposed adjacent a periphery of the optical zone.

38. The method of claim 22, wherein the diffractive structure is disposed adjacent the peripheral zone.

39. The method of claim 22, wherein the diffractive structure is disposed about a circumference of the optic zone.

40. The method of claim 22, wherein the diffractive structure is circumferentially disposed around at least a portion of the optical zone.

41. The method of claim 22, wherein the diffractive structure is circumferentially disposed around the optic zone at a predetermined radius from the center of the optic zone.

42. The method of claim 22, wherein the diffractive structure comprises mechanical features configured to exhibit optical diffraction of incident light.

43. A photochromic ophthalmic lens comprising:
a main body comprising an optical zone and a peripheral zone disposed adjacent the optical zone, wherein the optical zone comprises a refractive structure and one or more of the optical zone and the peripheral zone comprises a photochromic dye; and
a diffractive structure disposed within or adjacent the optical zone,
wherein the ophthalmic lens has a thickness profile that is configured based on a cosmetic profile associated with a target level of transmission (% T),
wherein a vision profile associated with the ophthalmic lens is defined based at least on the diffractive structure; and
wherein the cosmetic profile comprises a target amount of the photochromic dye in one or more of the optical zone and the peripheral zone.

44. The photochromic ophthalmic lens of claim 43, wherein the thickness profile is optimized based on the cosmetic profile over the vision profile.

45. The photochromic ophthalmic lens of claim 43, wherein the vision profile comprises an optical power profile.

46. The photochromic ophthalmic lens of claim 43, wherein the vision profile is defined based on at least the refractive structure and the diffractive structure.

47. The photochromic ophthalmic lens of claim 43, wherein the vision profile is associated with a target optical power.

48. The photochromic ophthalmic lens of claim 47, wherein the target optical power is between −20 D and +20 D.

49. The photochromic ophthalmic lens of claim 43, wherein the diffractive structure is disposed on one or more of a rear optical surface and a front optical surface of the photochromic ophthalmic lens.

50. The photochromic ophthalmic lens of claim 43, wherein the diffractive is imbedded in the photochromic ophthalmic lens.

51. The photochromic ophthalmic lens of claim 43, wherein photochromic ophthalmic lens comprises a soft contact lens.

52. The photochromic ophthalmic lens of claim 43, wherein a thickness ratio is greater than 0.65.

53. A photochromic ophthalmic lens comprising:
a main body comprising an optical zone and a peripheral zone disposed adjacent the optical zone, wherein the optical zone comprises a refractive structure and one or more of the optical zone and the peripheral zone comprises a photochromic dye; and
a diffractive structure disposed within or adjacent the optical zone,
wherein the ophthalmic lens has a thickness profile that is configured based on a cosmetic profile associated with a target level of transmission (% T),
wherein a vision profile associated with the ophthalmic lens is defined based at least on the diffractive structure; and
wherein the diffractive structure is disposed either on one or more of a rear optical surface or a front optical surface of the photochromic ophthalmic lens.

54. The photochromic ophthalmic lens of claim 53, wherein the thickness profile is optimized based on the cosmetic profile over the vision profile.

55. The photochromic ophthalmic lens of claim 53, wherein the cosmetic profile comprises a target amount of the photochromic dye in one or more of the optical zone and the peripheral zone.

56. The photochromic ophthalmic lens of claim 53, wherein the vision profile comprises an optical power profile.

57. The photochromic ophthalmic lens of claim 53, wherein the vision profile is defined based on at least the refractive structure and the diffractive structure.

58. The photochromic ophthalmic lens of claim 53, wherein the vision profile is associated with a target optical power.

59. The photochromic ophthalmic lens of claim 58, wherein the target optical power is between −20 D and +20 D.

60. The photochromic ophthalmic lens of claim 53, wherein the at least a portion of the diffractive surface is imbedded in the photochromic ophthalmic lens.

61. The photochromic ophthalmic lens of claim 53, wherein photochromic ophthalmic lens comprises a soft contact lens.

62. The photochromic ophthalmic lens of claim 53, wherein a thickness ratio is greater than 0.65.

* * * * *